United States Patent [19]

McCorkle, Jr.

[11] 4,023,749
[45] May 17, 1977

[54] DIRECTIONAL CONTROL SYSTEM FOR ARTILLERY MISSILES

[75] Inventor: William C. McCorkle, Jr., Huntsville, Ala.

[73] Assignee: The United States of America as represented by the Secretary of the Army, Washington, D.C.

[22] Filed: Dec. 8, 1975

[21] Appl. No.: 638,480

[52] U.S. Cl. .................. 244/3.22; 239/265.1 G
[51] Int. Cl.² ............... F42B 13/30; F42B 15/18; F41G 7/14; F41G 9/00
[58] Field of Search ............ 239/265.19; 244/3.21, 244/3.22

[56] References Cited

UNITED STATES PATENTS

| | | |
|---|---|---|
| 2,644,296 | 7/1953 | Sanz et al. .................. 244/3.21 |
| 2,692,475 | 10/1954 | Hull .................. 244/3.22 |
| 2,850,977 | 9/1958 | Pollak .................. 244/3.22 |
| 2,969,017 | 1/1971 | Kershner .................. 244/3.21 |
| 3,245,352 | 4/1966 | Summers .................. 244/3.21 |
| 3,743,184 | 7/1973 | Mancus .................. 239/265.19 |
| 3,946,968 | 3/1976 | Stallard .................. 244/3.21 |

*Primary Examiner*—Samuel W. Engle
*Assistant Examiner*—Thomas H. Webb
*Attorney, Agent, or Firm*—Nathan Edelberg; Robert P. Gibson; Harold W. Hilton

[57] ABSTRACT

Apparatus for controlling the powered flight phase of an artillery rocket to a straight line as determined by a 2° of freedom gyroscope with spin axis aligned along the missile axis. The flight path is made insensitive to crosswinds, launching transients, and missile thrust malalignments, without requiring lateral acceleration measurements.

5 Claims, 2 Drawing Figures

DIRECTIONAL CONTROL SYSTEM FOR ARTILLERY MISSILES

BACKGROUND OF THE INVENTION

The search for accuracy improvement has, in recent years, included the investigation of simplified guidance schemes. The best known of these schemes at present is the directional control concept which utilizes an attitude reference provided by a 2° of freedom gyro to obtain missile attitude information used as an input to a control system which generates corrective torques proportional to missile attitude. The directional control principle is utilized to compensate for the three principle directional error sources, i.e., (1) linear thrust malalignment or failure of the thrust axis to pass through the rocket center of mass by a certain distance; (2) mallaunch or the unpredictable component of angular motion at a transverse axis at the instant the rocket leaves the launcher; (3) crosswind effect. Stable rockets turn upwind, and the thrust drives the rocket off the intended path. The crosswind effect is the most difficult error to suppress.

SUMMARY OF THE INVENTION

A missile having its direction controlled inflight by a directional control system. The missile is provided with a single 2° of freedom gyro oriented with spin axis initially along the missle axis, capable of maintaining an attitude reference direction in two orthogonal planes within required accuracy for the duration of the powered flight of the missile. An amplifier is provided for taking the two orthogonal outputs from the gyro and converting them to signals of the proper magnitude and phase to actuate two control force generators acting in the same orthogonal planes corresponding to the gyro pickoff planes. A control force generator is provided in each orthogonal gyro pickoff plane, which generates a moment acting on the missile so as to tend to cause the missile to align itself with the gyro reference axis.

It is therefore, an object of the present invention to provide a missile with an attitude control system which requires no measurement of acceleration, velocity or displacement perpendicular to the aim line.

It is a further object of the present invention to provide such a control system in which the missile velocity and displacement perpendicular to the aim line are effectively controlled in spite of the disturbing influences of wind, launching transients, or misalignments of missile components.

These and other objects of the present invention will become more readily apparent from the following description and drawing.

DESCRIPTION OF THE PREFERRED EMBODIMENT

Figure 1:
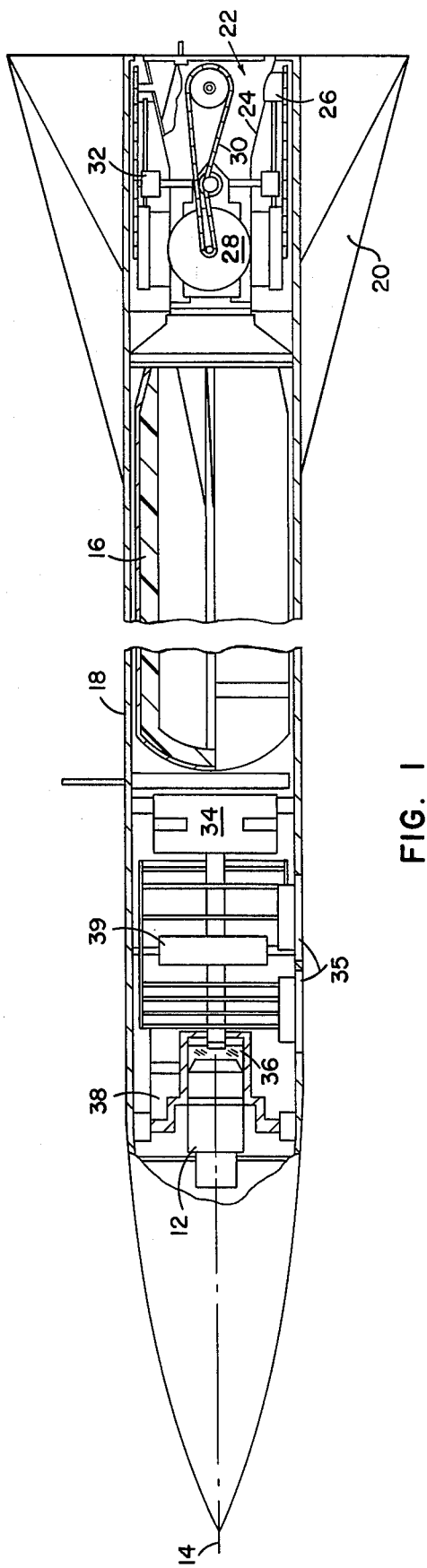
FIG. 1 is an elevational sectional view of a missile utilizing the principles of the present invention.
Figure 2:
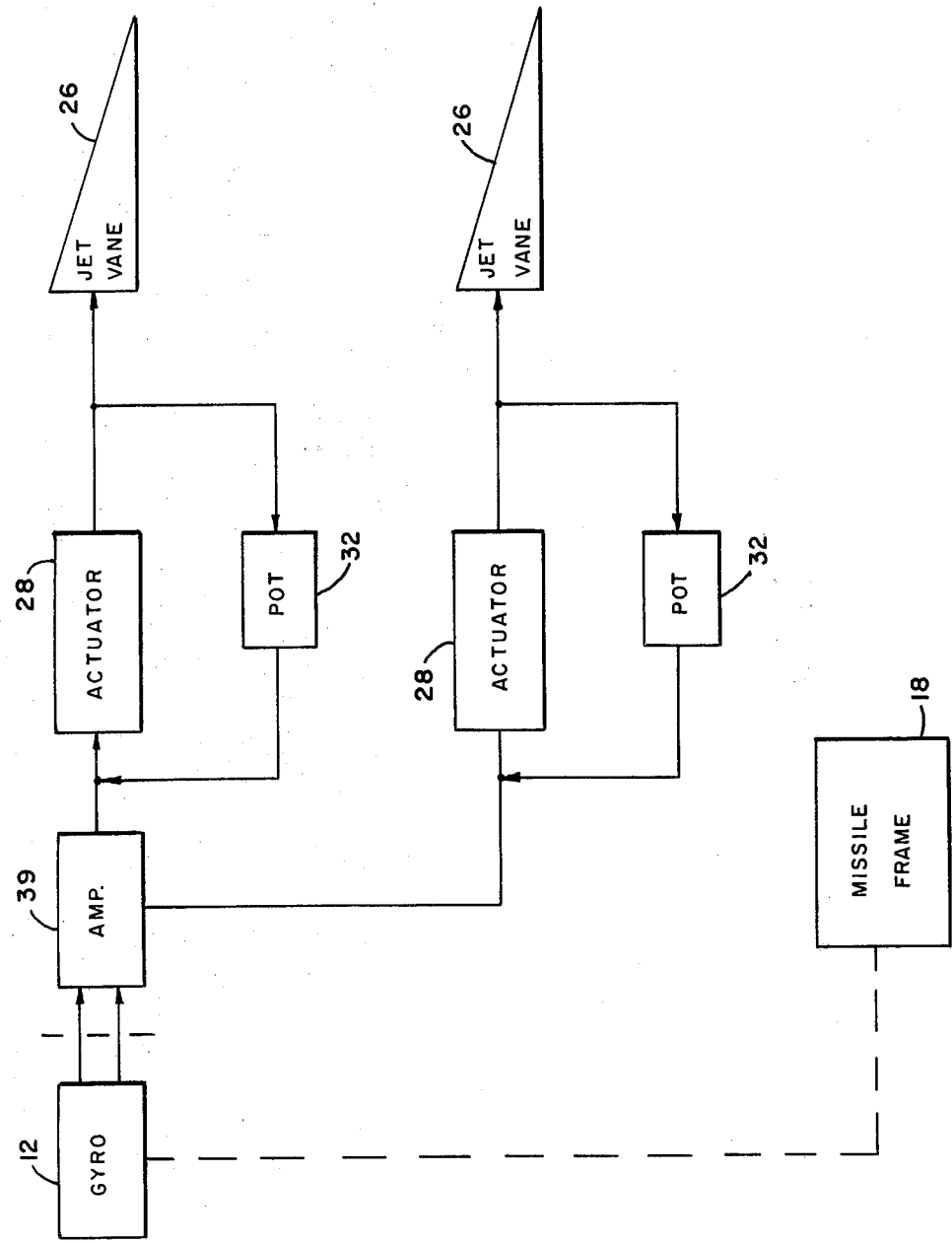
FIG. 2 is a diagrammatic view of the control system of the present invention including the pickoff means for one orthogonal plane.

As shown in FIG. 1 a missile 10 is provided with a gyro 12 aligned along the longitudinal axis 14 of the missile. Missile 10 further includes a motor 16, inside missile frame 18, and fins 20 mounted on the external surface of frame 18. Jet vane assemblies 22 are carried around the exit cone 24 of motor 16. The jet vane assemblies include four jet vanes 26 disposed symmetrically in co-axial pairs 90° apart in the interior of the expansion cone of the nozzle. Four electrical actuators 28 are connected by four chain drives 30 to jet vanes 26 whereby the jet vanes are differentially canted so as to produce a rolling torque.

Gyro 12 includes a pitch pickoff to detect angular motion of the missile in the missile fixed pitch plane with respct to the gyro spin axis, and actuates the co-axial pair of jet vanes whose axis is perpendicular to the missile fixed pitch plane. Similarly in the orthogonal (yaw) plane, the yaw pickoff operates, independently, the yaw pair of jet vanes. Thus, each pair of vanes generates control forces only in the plane of the corresponding gyro pickoff. The designation pitch and yaw refers only to the missile fixed reference system since the missile rolls in the earth-fixed system. The control system is adjusted to produce an amount of jet vane deflection proportional to the gyro pickoff signal. The choice of this proportionality constant depends on the size of the jet vanes and other factors, but is, for optimum accuracy, chosen to minimize the sensitivity to crosswinds. The jet vane actuation system is of the contactor servo type, with jet vane position feedback provided by potentiometers 32. The control actuators must have negligible lead or lag of the gyro control signal for frequencies up to the maximum roll rate expected.

A source of power is provided, such a battery 34 to operate the electric servo motors turning the vanes in the rocket exhaust stream for generating the control forces which generates a moment acting on the missile so as to tend to cause the missile to align itself with the gyro reference axis. The forces which generate moments tending to align missile and reference axis may be located longitudinally on the axis of the missile either fore or aft of the region between the missile center of gravity and aerodynamic center of pressure, which center of pressure must always be aft of the center of gravity. The magnitude of the control force, however generated, must be approximately, in each control plane, $$F_c = \frac{l_a}{l_a \pm l_c} T\delta$$

where $l_a$ is the distance from the missile center of gravity to the aerodynamic center of pressure, $l_c$ is the moment arm of the control force about the center of gravity, $T$ is the missile thrust, and $\delta$ is the angle measured by the pickoff between the gyro reference and the missile axis. The positive sign holds if the control force is applied forward of the missile center of gravity, and the negative sign applies for control force applied aft of the center of gravity. For most practical applications the magnitude of $l_c$ will be greater than $l_a$, so that the restriction noted above, that the control force cannot be applied between the missile center of gravity and center of aerodynamic pressure, will automatically be satisfied. The direction of action of the control force must always be such as to tend to align the missile with the reference (gyro) axis.

The missile is aimed by traversing and elevating the launcher, with the aid of a prism 36 optically aligned to the gyroscope axis 14 prior to assembly. Similar prisms can be used for both elevation and azimuth, or a level bubble referenced to the gyro axis can be used in elevation. Prisms (and level bubble, if used) are viewed through small glass apertures in the missile skin (not shown), and aim is checked with a theodolite using standard techniques.

The gyroscope 12 is activated (spun up and uncaged) by any of several techniques for rapid activation known in the art. In certain tests it was done with a spring motor, in others compressed air was used.

The signal to activate gyro, turn on missile power and perform any other necessary functions from external sources is carried into the missile through umbilicals (not shown), which are disconnected and dropped away from receptables 35 prior to ignition of motor 16. After motor ignition the missile moves forward and at first motion an acceleration switch 38 closes, and a signal is generated which, acting through amplifier 39 powered by battery 34 causes the four jet vanes 26 to be differentially canted by four electrical actuators 28 connected by four chain drives 30 to jet vanes 26, so as to produce a rolling torque. The roll torque causes the missile to build up a roll of about four revolutions per second by the time the timer (not shown) removes the differential cant on the jet vanes 26 (after about 200 milliseconds). During this time, and afterwards, signals from the gyro 12 are also amplified and transmitted to the actuators 28 to cause opposing pairs of jet vanes to deflect in unison in proportion to gyro pitch and yaw signals.

The effectiveness of the control system is limited to the burning period of the motor. The fins 20 are set at an angle to the missile axis so as to maintain the roll established during the jet vane differential cant phase, within limits of three to five revolutions per second during powered flight.

The power to operate the actuators is transmitted from the control amplifier 38 and battery 34 by conduits (not shown) passing between the missile skin and motor 16 to actuators 28, and feedback potentiometer 32 output returns to the control amplifier 38 similarly.

I claim:

1. A directional control system for maintaining a missile on a launch predetermined path comprising:
    a. a gyroscope mounted with its spin axis and rotor aligned with the longitudinal axis of said missile at launch;
    b. actuating means including a plurality of jet vanes disposed in pairs about the aft end of said missile;
    c. acceleration switch means for differentially canting said vanes for producing a spin to said missile responsive to initial acceleration thereof;
    d. control means for receiving signals from said gyro and actuating said actuator means for deflecting opposing pairs of jet vanes in unison in proportion to gyro pitch and yaw signals.

2. A directional control system as set forth in claim 1 wherein said plurality of jet vanes is comprised of four vanes disposed in equally spaced relation.

3. A directional control system as in claim 2 wherein said actuator means includes four electrical actuators, each respectively connected to one of said jet vanes to receive said gyro signals for the deflection of said jet vanes.

4. A directional control system as set forth in claim 3 including chain drive means connecting said jet means and said actuators.

5. A directional control system as set forth in claim 4 wherein said control system further includes amplifier means for receiving pitch and yaw signals from said gyro and for transmitting said signals to said actuators.

* * * * *